United States Patent
Moon et al.

(10) Patent No.: US 9,462,165 B2
(45) Date of Patent: Oct. 4, 2016

(54) ELECTRONIC DEVICE INCLUDING CAMERA MODULE

(71) Applicant: Samsung Electronics Co., Ltd., Gyeonggi-do (KR)

(72) Inventors: Heecheul Moon, Gyeonggi-do (KR); Yongseok Lee, Seoul (KR); Jongchul Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 70 days.

(21) Appl. No.: 14/197,777

(22) Filed: Mar. 5, 2014

(65) Prior Publication Data
US 2014/0253799 A1 Sep. 11, 2014

(30) Foreign Application Priority Data
Mar. 11, 2013 (KR) .................. 10-2013-0025735

(51) Int. Cl.
*H04N 5/225* (2006.01)
*H04M 1/02* (2006.01)

(52) U.S. Cl.
CPC ......... *H04N 5/2252* (2013.01); *H04M 1/0264* (2013.01); *H04N 5/2253* (2013.01); *H04N 5/2257* (2013.01)

(58) Field of Classification Search
None
See application file for complete search history.

(56) References Cited

U.S. PATENT DOCUMENTS

| | | | |
|---|---|---|---|
| 2008/0205873 A1* | 8/2008 | Park | G03B 11/06 396/200 |
| 2009/0252488 A1 | 10/2009 | Eromaki et al. | |
| 2011/0050986 A1 | 3/2011 | Wang | |
| 2011/0050989 A1 | 3/2011 | Kim et al. | |
| 2011/0255000 A1* | 10/2011 | Weber | B23K 26/0003 348/374 |
| 2012/0218648 A1* | 8/2012 | Lin | G02B 13/0085 359/715 |
| 2012/0320503 A1 | 12/2012 | Yturralde et al. | |
| 2013/0051785 A1 | 2/2013 | Pope et al. | |

FOREIGN PATENT DOCUMENTS

KR 10-0964541 B1 6/2010

* cited by examiner

*Primary Examiner* — Mark Monk
(74) *Attorney, Agent, or Firm* — Cha & Reiter, LLC

(57) ABSTRACT

An electronic device including a camera module and a bracket for supporting the camera module provides for a slimmer construction and better absorption of the impact of external forces. The camera module includes a camera lens module, a housing having an opening and containing the camera lens module, and a camera window for covering the opening of the housing. The bracket includes a region for supporting at least a portion of the housing.

5 Claims, 13 Drawing Sheets

ELECTRONIC DEVICE INCLUDING CAMERA MODULE

CLAIM OF PRIORITY

This application claims the benefit of priority under 35 U.S.C. §119(a) from a Korean patent application filed on Mar. 11, 2013 in the Korean Intellectual Property Office and assigned Serial No. 10-2013-0025735, the entire disclosure of which is hereby incorporated by reference in its entirety.

BACKGROUND

1. Technical Field

The present disclosure relates to an electronic device and, more particularly to an electronic device including a camera module.

2. Description of the Related Art

Recently, mobile electronic devices or electronic equipment having various functions are rapidly being developed. With regard to mobile electronic equipment, portability is one of the most important factors, and therefore research efforts continue to provide for the miniaturization, weight reduction, and the production of slimmer mobile equipment.

However, in order to provide various functions, various components are required for the mobile electronic equipment. Therefore, the necessity for miniaturizing the mobile equipment having a plurality of high performance components is actually increasing.

Recent mobile electronic equipment generally includes a camera, and a camera module is included in the mobile electronic equipment. In the past, the camera module was connected to the portable terminal through a cable. Nowadays, the camera module is integrated into the portable terminal as a common design.

The camera module is provided in a package form including various components so that the camera module can collect images of subjects by mounting in the portable terminal. For example, the camera module may include a lens, shutter wing, image sensor, and PCB (Printed Circuit Board). Further, the camera module may include a case for integrating the above components.

The camera module having such a configuration and mounted in the terminal is surrounded by various structures to protect from an impact. Therefore, the portable terminals may be provided in a form that an installation region of the camera module protrudes from other regions.

A camera module having a structure of protruding from adjacent regions of the portable terminal has a higher risk of damages, because an impact is concentrated onto the protruding camera module. In order to reduce the risk of damages, a method of reinforcing the structures may be considered by surrounding the camera module, however this may lead to an increase of the thickness and weight of the equipment. Therefore, there is a need to provide a terminal with a slimmer camera module having a structure that is able to withstand impacts.

SUMMARY

Aspects of the present disclosure provide a structure for miniaturizing a mobile equipment having a plurality of high performance components.

In accordance with one of the aspects of the present disclosure, an electronic device including a camera module and a bracket for supporting the camera module is provided. The camera module includes a camera lens module, a housing configured to include an opening and to contain the camera lens module, and a camera window configured to cover the opening of the housing. The bracket is configured to include a region for supporting at least a portion of the housing.

In accordance with another aspect of the present disclosure, an electronic device including a camera module and a bracket is provided. The camera module includes an inner housing configured to contain a camera lens module and an outer housing configured to be joined with the inner housing. The outer housing includes an extended wing, and the bracket contains the camera module and supports at least a portion of the wing.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, embodiments of the disclosure are described in detail with reference to the accompanying drawings. The same reference symbols are used throughout the drawings to refer to the same or similar parts. Detailed descriptions of well-known functions and structures incorporated herein may be omitted to avoid obscuring appreciation of the subject matter of the disclosure by a person of ordinary skill in the art. For the same reasons, some components in the accompanying drawings are emphasized, omitted, or schematically illustrated, and the size of each component does not fully reflect the actual size. Therefore, the appended claims are not limited to the relative sizes and distances illustrated in the accompanying drawings.

Figure 1A:
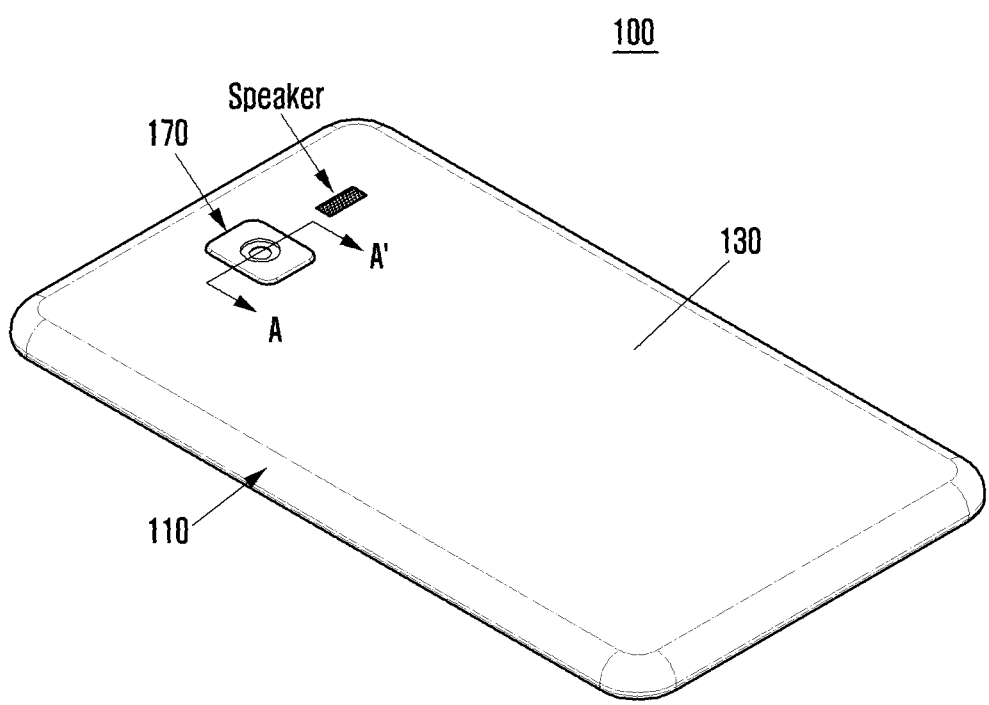
FIG. 1A and FIG. 1B are schematic drawings respectively illustrating appearances of the front and rear perspective views of a terminal having a camera module according to an embodiment of the present disclosure.
Figure 1B:
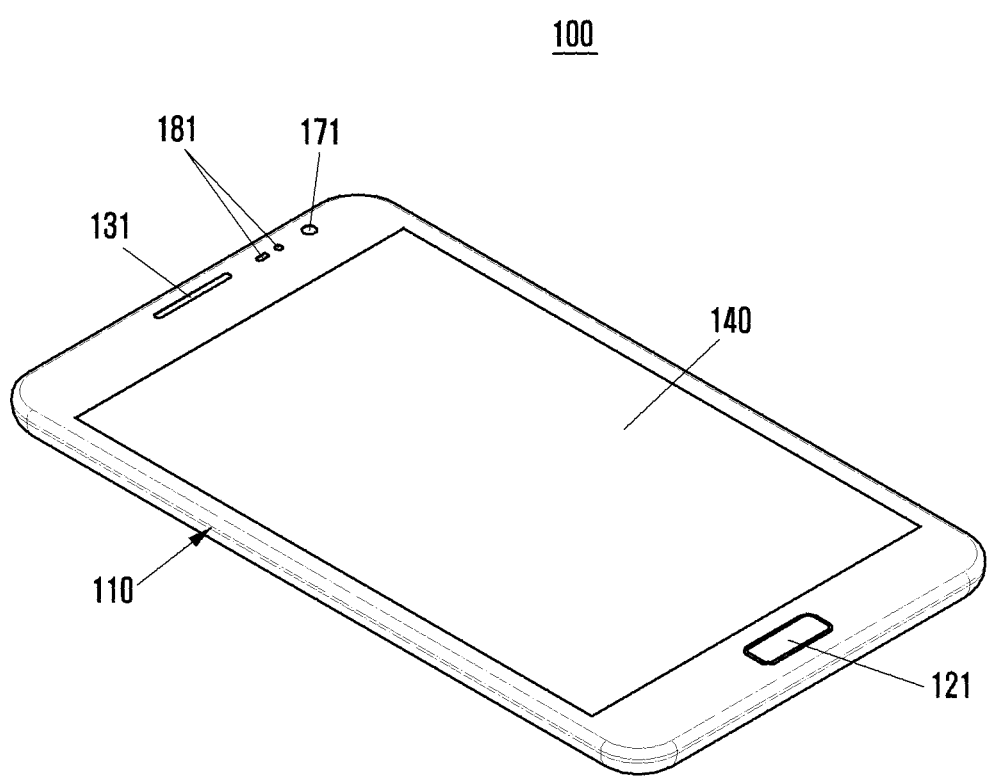

FIGS. 1A and 1B are schematic drawings illustrating appearances of the front and rear perspective views of a terminal having a camera module according to an embodiment of the present disclosure. Various embodiments of the present disclosure have been described based on a mobile equipment, especially for a smart phone, however it will be apparent to those of ordinary skill in the art that the embodiments can be applied to various electronic equipment or mobile equipment installed with a camera.

Referring now to FIGS. 1A and 1B, the terminal 100 according to an embodiment of the present disclosure may include a battery cover (or back cover) 130, body 110 mounted with the back cover 130 (which may serve as the battery cover), and camera module 170 disposed in a portion of the body 110. The camera module 170 may be provided at one of various locations of the body 100. For example, even though the drawing shows that the camera module 170 is disposed at the upper center of the terminal 100, the camera module 170 may be differently disposed at the upper right or at the upper left of the terminal 100, or lower left or lower right, or at the center or at the bottom of the terminal 100. In another embodiment of the present disclosure, the terminal 100 may further include a speaker, microphone, receiver 131, front camera 171, proximity switch 181, and a home key 121.

In the terminal 100 including the above configuration according to an embodiment of the present disclosure, the back cover 130 and the body 110 may be integrated into the terminal 100. In another embodiment of the present disclosure, the back cover 130 may be formed so that a battery can be replaced by separating the battery from the terminal body (i.e., from an internal rear cover 1302 of FIG. 2A).

Figure 2A:
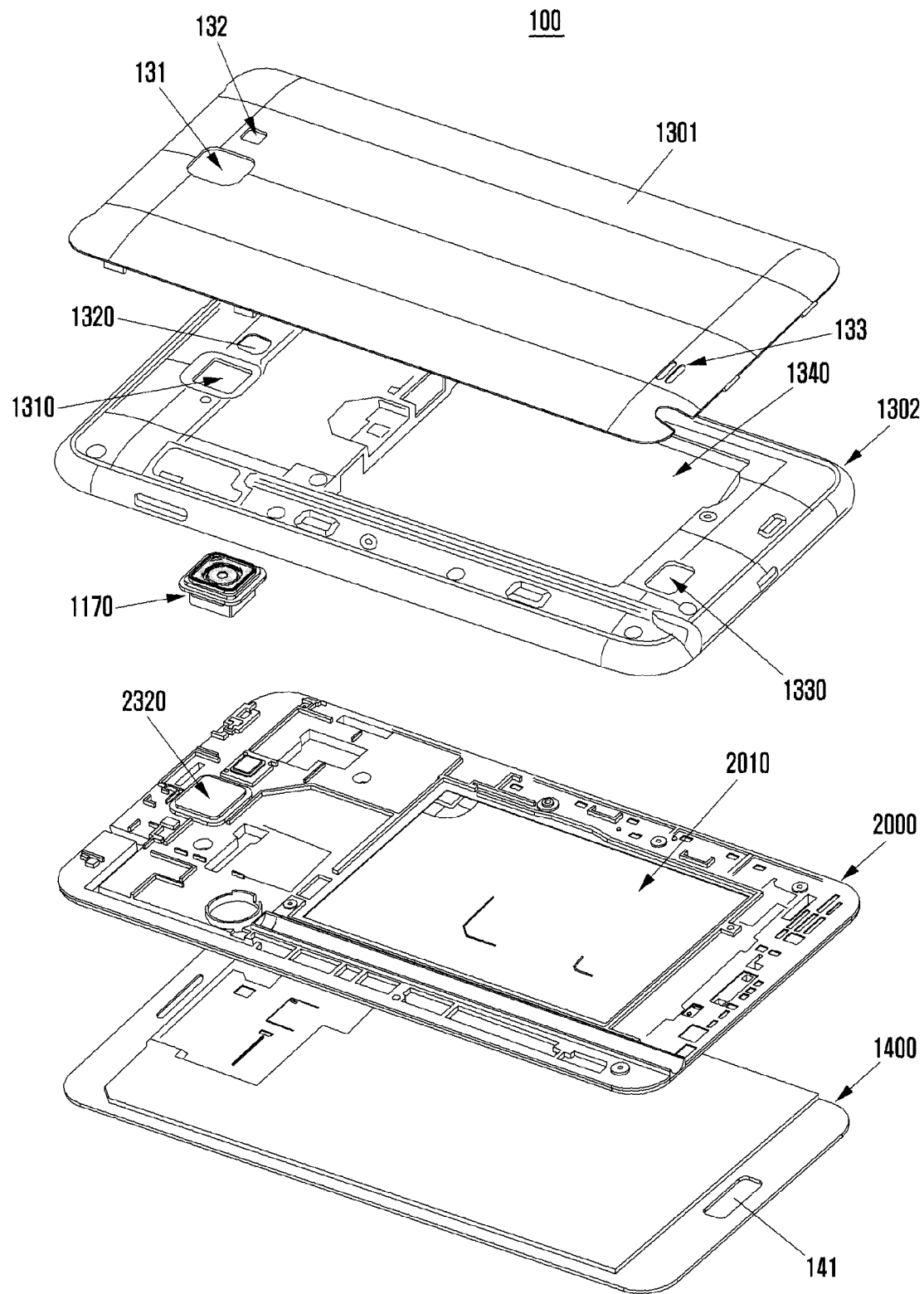
FIG. 2A is an exploded view of a terminal according to the present disclosure.

With reference to FIG. 2A, a display module 1400 including hardware including a display unit 140 may be disposed at the front side of the body 110 mounted with the back cover 130. The display unit 140 may output various screens related to the operation of the terminal 100. Further, the display unit 140 may be formed with a touch screen that operates as an input means of the terminal 100. Accordingly, the display unit 140 may transmit an input signal to a control unit of the terminal 100 corresponding to a user's finger touch or a pen touch. The display module 1400 may include various components (for example, an LCD or OLED panel, touch recognition panel, and stylus pen input panel) for the operation of the touch screen.

Referring again to FIG. 1B, the receiver 131 outputs an audio signal played by the terminal 100 or received through a voice communication or a video communication. The front camera 171 (FIG. 1B) is a component providing an image collection function, and may be used for the video communication or a self-photography (a.k.a. "selfies"). The front camera 171 may be configured with a camera performing at a relatively lower resolution when photographing as compared to the rear camera module 170. Accordingly, the front camera 171 may be smaller than the rear camera module 170. The proximity sensor 181 includes an optic acquisition unit and a light emitting unit, and may detect an approach of an object or an intensity of illumination, or a change in illumination, by controlling the optic acquisition unit to receive lights emitted by the light emitting unit. In view of the aforementioned, the proximity sensor 181 may be configured with an illumination sensor. In addition, the home key 121 may be one of hardware keys of the terminal 100. The home key 121 may be mapped so that the terminal 100 can support a wake-up function, home screen switching function, and task list screen switching function.

The terminal 100 including the above configuration according to an embodiment of the present disclosure include camera module 170 arranged on a rear side of the terminal 100. According to this embodiment of the present disclosure, the camera module 170 may include a structure that reduces a mounting space needed in the terminal 100 to arrange the camera module 170. In the terminal 100 according to the embodiment of the present disclosure, a housing for supporting a camera window may include a wing 1030 (FIG. 2B) as a component of the camera module 170.

After mounting the camera module 170, at least one of the rear cover 1302 (which will be described later referring to FIG. 2A) for covering a rear half side of the terminal 100 and the back cover 130 may be disposed by stacking with the wing. Therefore, the terminal 100 according to the embodiment of the present disclosure is provided to show that an impact generated at the front side of the camera window can be delivered to a sidewall of the housing and the wing in the downward direction, and absorbed by at least one of a bracket, rear cover 1302, and back cover 130. Therefore, the terminal 100 according to the embodiment of the present disclosure can improve a damage protection effect for the camera module 170 through a proper impact distribution of a force applied to the terminal, for example, including but not limited to dropping the terminal 100.

As described above, in the terminal 100 according to the embodiment of the present disclosure, the camera module 170 may be configured so that the camera windows can be supported by a housing surrounding a lens module. Accordingly, the height or thickness of the camera module 170 can be reduced from the height or thickness of conventional devices.

The camera module 170 according to the embodiment of the present disclosure may include a wing 1030 in the housing. When mounting the camera module 170 in the terminal 100, adjacent structures such as a rear cover 1302 and a deco may be disposed so that the structures can be assembled with the wing. Hereafter, a configuration and a mounting method of the camera module 170 according to various embodiments of the present disclosure will be described in more detail referring to the accompanying drawings.

Figure 2B:
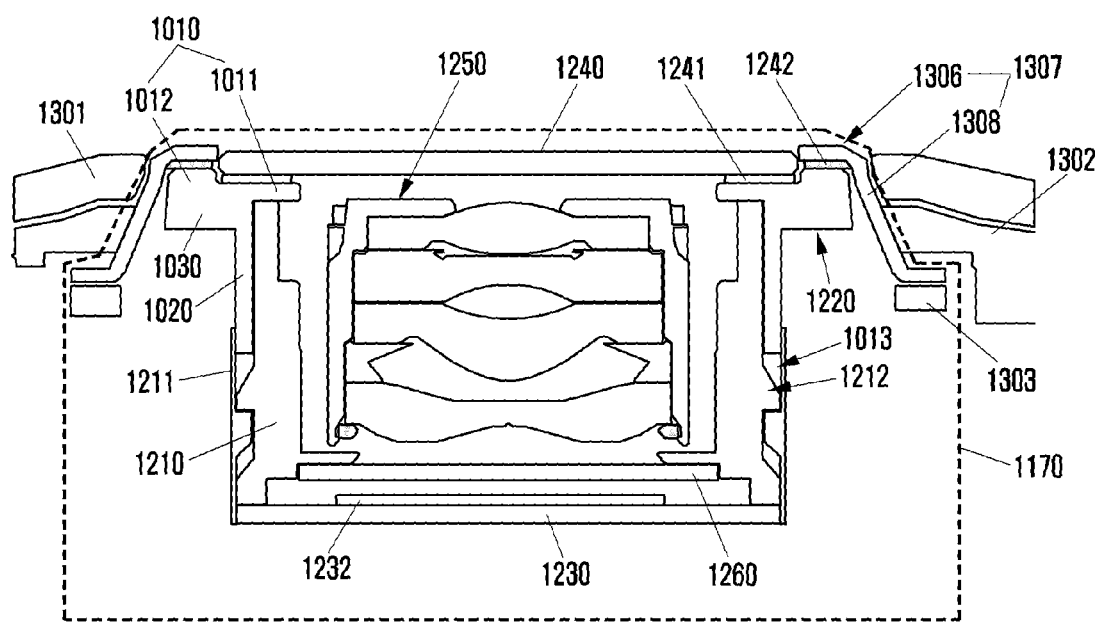
FIG. 2B is a sectional view illustrating a cross section along the line A-A' of FIG. 1A.
Figure 3:
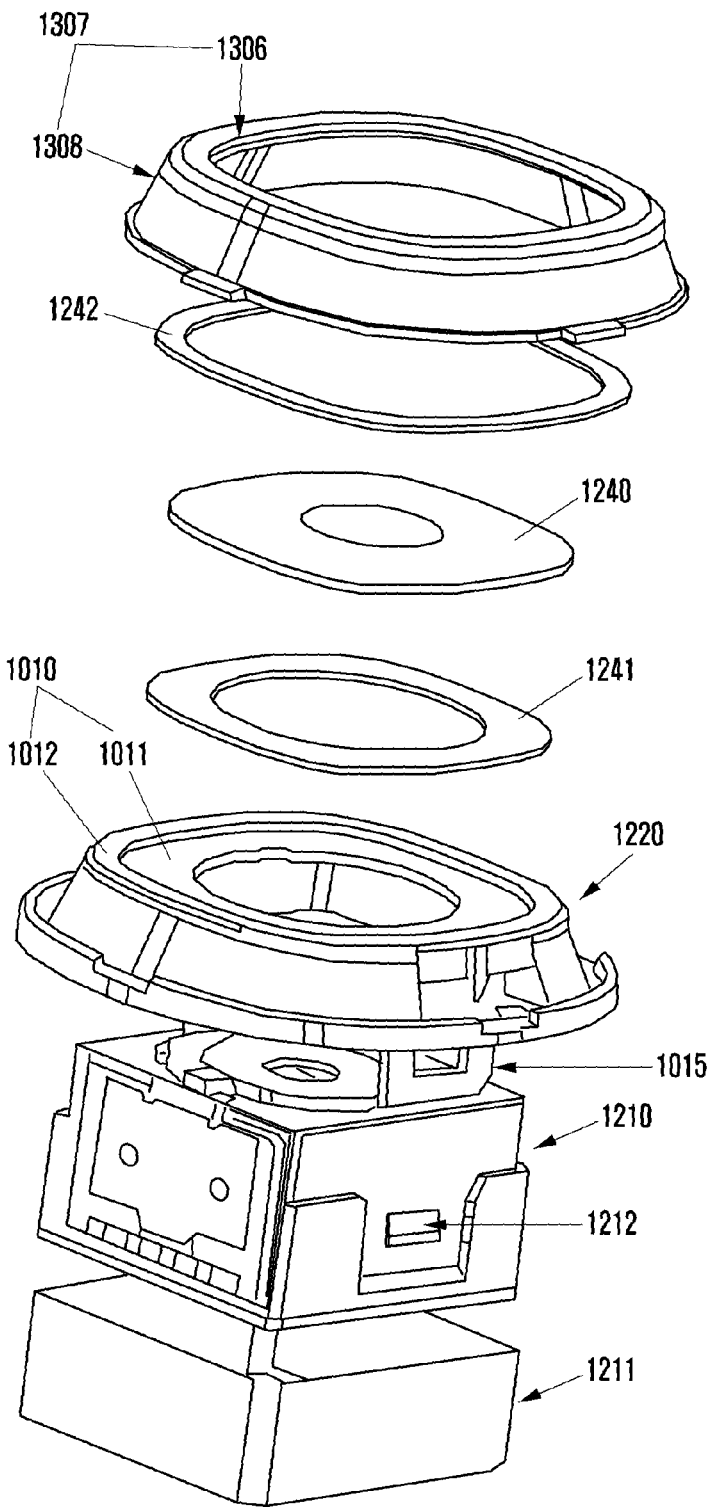
FIG. 3 is an exploded view illustrating a first camera module according to an embodiment of the present disclosure.

FIGS. 2A and 2B are drawings illustrating a structure of assembling the terminal 100 and the camera module 1170 according to a first embodiment of the present disclosure. In particular, FIG. 2B is a schematic drawing illustrating a cross section obtained along the line A-A' of FIG. 1A. FIG. 3 is an exploded view illustrating a configuration of the first camera module 1170 according to an embodiment of the present disclosure.

Referring now to FIGS. 2A and 2B, terminal 100 according to the present disclosure is configured by stacking a back cover 1301, rear cover 1302, bracket 2000, and display module 1400. The back cover 1301 includes a first camera hole 131 for exposing the camera module 1170 and a first speaker hole 132 for disposing a speaker included in the terminal 100. The first speaker hole 132 may be used as a flash hole according to the design of the terminal 100. Further, a first auxiliary speaker hole 133 may be provided at a side of the back cover 1301 for supporting a separately provided acoustic speaker.

The rear cover 1302 is disposed at the lower side of the back cover 1301. A second camera hole 1310 for exposing the camera module 1170, and a second speaker hole 1320 for disposing a speaker may be provided in the rear cover 1302.

The camera holes are in substantial alignment to receive the camera module 1170. A battery hole 1340 may be provided in the center area of the rear cover 1302 for disposing a battery. A second auxiliary speaker hole 1330 may be provided at a side of the rear cover 1302 for disposing an auxiliary speaker. The rear cover 1302 restrict movement of components mounted on the bracket 2000 and protect from impacts by combining with the bracket 2000. The bracket 2000 provides a predetermined size of space so that the camera module 1170 and components of the terminal 100, such as a circuit module, speaker, and hardware key can be disposed. In particular, the bracket 2000 provides a camera mounting space for the camera module 1170. A battery mounting space 2010 may be provided in the center area of the bracket 2000 for installing the battery.

A home key hole 141 may be provided at a side of the display module 1400 for disposing a hardware key to an exterior of the front of the terminal, such as a home key.

An area of the terminal 100 for mounting the first camera module 1170 may include an area for mounting the first camera module 1170 and a rear cover 1302 for covering the first camera module 1170 after mounting the first camera module 1170 as shown in FIG. 2.

The rear cover 1302 may have a structure that covers a main board of the terminal to protect the main board. The rear cover 1302 may be formed with a rigid material such as a plastic (for example, polycarbonate or ABS). Even though not shown in the drawing, the rear cover 1302 may be assembled with the main board by using fasteners, such as a screw or a hook. In particular, an opening may be formed in an area of the rear cover 1302 to expose the first camera module 1170 corresponding to an area installing the first camera module 1170. The opening of the rear cover 1302 may be disposed to surround the edges of the first camera module 1170.

According to an embodiment of the present disclosure, the first camera module 1170 may include a circuit module 1232, camera PCB 1230, inner housing 1210, outer housing 1220, lens module 1250, camera window 1240, and deco 1307 as shown in FIGS. 2A, 2B and 3.

As shown in FIG. 2B, the circuit module 1232 is mounted on the camera PCB 1230. The inner housing 1210 may be disposed by surrounding the camera PCB 1230, and the outer housing 1220 may be formed with a wing 1030 and joined with the inner housing 1210. The lens module 1250 may be disposed in a space formed by the inner housing 1210 and the outer housing 1220. The camera window 1240 is disposed to cover the opening of the housing 1220 which is formed to expose the lens module 1250. The deco 1307 may be joined with the edges of the outer housing 1220.

The first camera module 1170 may include an adhesive layer 1241 for fixing the camera window 1240 and an adhesive layer 1242 for fixing the deco 1307 to the edges of the outer housing 1220. Further, the first camera module 1170 may include a protection tape 1211 for a rigidity reinforcement. Here, the adhesive layer 1241 and the adhesive layer 1242 may be provided in a form such that both sides of a tape is coated with an adhesive material. An artisan appreciates that there are also other types of adhesive other than coated tape.

The camera PCB 1230 mounted with the circuit module 1232 may be disposed at the lower side of the first camera module 1170. The circuit module 1232 may transmit image information formed in the image sensor 1260 of the lens module 1250 to the control unit of the terminal 100. For this, a circuit wiring may be provided at a side of the camera PCB 1230. The circuit wiring may be provided in a form of FPCB (Flexible Printed Circuit Board).

The lens module 1250 includes at least one lens, and a shutter slit. The lenses may be disposed in an area where the light inflows from the outside. An image sensor 1260 arranged within the inner housing collects the light passing through the lenses. The shutter slit controls the passing of light through an aperture to be sensed by the image sensor 1260. The lens module 1250 may be replaced by structures in various forms or a structure in a simple form according to the performance of the first camera module 1170. The lens module 1250 is fixed in a predetermined space formed by connecting the inner housing 1210 and the outer housing 1220. The lens module 1250 is arranged in a predetermined space formed by connecting the inner housing 1210 and the outer housing.

The inner housing 1210 may have an opening at its upper side. The inner housing 1210 may be provided in a box shape to protect the mounted lens module 1250 as shown in the drawing, however the shape is not limited to box-shaped. The inner housing 1210 may include a hook 1212 to connect the outer housing 1220 to at least one sidewall. The open upper side of the inner housing 1210 is in contact with the outer housing 1220, and thereby performs a role of supporting the outer housing 1220. According to an embodiment of the present disclosure, the inner housing 1210 may receive an impact delivered to the outer housing 1220 through the sidewalls, and transfer it to the bracket of the terminal 100 in which the first camera module 1170 is mounted. Therefore, the inner housing 1210 can perform a role of protecting the lens module 1250 from damages by permitting distribution of a force applied to the outer housing.

At least a portion of the outer housing 1220 may be disposed at the upper side of the inner housing 1210. The outer housing 1220 performs a role of preventing the lens module 1250 disposed in the inner housing 1210 from being displaced from its position in the inner housing 1210. The outer housing 1220 may be disposed to cover the open area of the inner housing 1210. Here, the outer housing 1220 may have an opening of a predetermined size in the center so that lights can be radiated to the lens module 1250 disposed in the inner housing 1210. The opening may be circular or other shapes as desired.

The outer housing 1220 may include a cover unit 1010, wing 1030, and sidewall 1020. The cover unit 1010 may be disposed to cover the open area of the inner housing 1210 by contacting at least a portion of the inner housing 1210. The wing 1030 may be provided by extending from an edge of the cover unit 1010. The sidewall 1020 may be formed vertical to the cover unit 1010 and facing a portion of the outer wall of the inner housing 1210.

In the illustrated embodiment, the cover unit 1010 may be provided in a stepped form so that the camera window 1240 is fixed after mounting. Namely, the cover unit 1010 includes a cover 1011 and a cover edge 1012. The cover 1011 may have an opening. The cover edge 1012 is provided in a form having a predetermined width from the edge of the cover 1011 and stepped from the cover 1011. The cover edge 1012 is formed to be higher than the cover 1011. The cover 1011 is formed in a rectangular shape, and the cover edge 1012 is accordingly formed in a rectangular shape. The cover 1011 may be formed in a rectangular or circular shape, and further can be formed in various shapes as desired.

The wing 1030 may be formed at an edge of the cover unit 1010. According to an embodiment of the present disclosure, the wing 1030 is formed having a predetermined angle to the cover edge 1012 and extending by a predetermined length.

In the illustrated embodiment, the wing 1030 is formed to have an angle substantially identical to that of the deco 1307 for a connection with the deco 1307. A band extending in the upper direction is provided at an end of the wing 1030 to support the deco 1307.

A hook 1212 formed in the inner housing 1210 and an extension 1015 having a hook hole 1013 may be provided at a side of the sidewall 1020. The extension 1015 is formed by extending from the sidewall toward the lower direction. The extension 1015 may have a hook hole 1013 in the center to connect with the hook 1212.

The adhesive layer 1241 may be disposed at the upper side of the outer housing 1220. The adhesive layer 1241 performs a role of limiting the movement of the camera window 1240 disposed in the outer housing 1220. For this, the adhesive layer 1241 may be formed corresponding to the shape of the cover 1011. Namely, an open area may be formed in the center of a rectangular plate corresponding to the opening of the outer housing 1220.

The camera window 1240 may be arranged so that light entering from the outside passes through the lens of the lens module 1250. Further, the camera window 1240 performs a role of sealing the outer housing 1220 to protect the lens module 1250 from an inflow of contaminants. The camera window 1240 may be fixed to the outer housing 1220 by the adhesive layer 1241. Only a portion of the camera window 1240 that is smaller than the opening of the outer housing 1220 may be provided in a transparent form to prevent a leakage of light and to concentrate the light coming from the outside into the lens module 1250. The other portion of the camera window 1240 may be provided in an opaque form. The camera window 1240 may be formed with a transparent reinforced glass or plastic. The opaque area of the camera window 1240 may be processed by adhering an opaque film or by coloring.

The adhesive layer 1242 may be disposed at the cover edge 1012 of the outer housing 1220. Accordingly, the adhesive layer 1242 is formed in a width corresponding to the width of the cover edge 1012. The deco 1307 is disposed at the upper side of the adhesive layer 1242. Accordingly, the adhesive layer 1242 fixes the cover edge 1012 of the outer housing 1220 to the upper inner side of the deco 1307.

The deco 1307 may be disposed facing the outer wall of the outer housing 1220 through the adhesive layer 1242. The deco 1307 supports the rigidity of the first camera module 1170 and performs a role of preventing an inflow of contaminants. The deco 1307 may be provided with a decoration for the rear side of the terminal. The deco 1307 may include a rectangular band 1306 and an inclined sidewall 1308. The rectangular band 1306 may contact the cover edge 1012 of the outer housing 1220. For this, the rectangular band 1306 may be formed in a circular shape.

The inclined sidewall 1308 may surround the rectangular band 1306 and face the outer wall of the wing 1030 of the outer housing 1220. The camera window 1240 is exposed to the outside through the open area of the rectangular band 1306. As a result, if the light passes through the transparent area formed in the center of the camera window 1240, the light is transferred to the lens module 1250 and an image is projected to the image sensor 1260.

A sponge can be disposed as a contaminant protection structure at the bottom of the deco 1307 when mounting the deco 1307 in the terminal. In the meantime, the rectangular band 1306 may be provided in various forms such as a circle, ellipse, and polygon according to a designer's intention.

With continued reference to FIG. 2B, at least one of the inner housing 1210 and the outer housing 1220 may be formed with polycarbonate (PC), stainless steel (SUS), or Aluminum (Al) or a ceramic. Further, the inner housing 1210 and the outer housing 1220 may be manufactured by a metal-inserted extrusion. The adhesive layer may be provided by bonding and taping, and an epoxy material can be used. The camera window may be formed with various materials such as acryl, glass, and sapphire. The deco may be formed with materials similar to those of the inner housing and outer housing, such as PC, SUS, and Al. The deco may be also provided by the metal-inserted extrusion.

In the above description, an example of separately providing the deco 1307 and disposing the deco 1307 on the outer housing 1220 through the adhesive layer 1242 has been described, however the embodiment of the present disclosure is not limited to this example. Namely, the deco 1307 can be omitted according to a designer's intention, and accordingly the adhesive layer 1242 can be omitted. If the deco 1307 is omitted, the shape of the outer housing 1220 may be designed to provide a similar rigidity and an esthetic appearance of the deco 1307. A structure of this type of outer housing will be described referring to the accompanying drawings.

As described above, the first camera module 1170 according to this embodiment of the present disclosure may include an inner housing 1210 for mounting a lens module 1250 and an outer housing 1220. In the first camera module 1170, a camera window 1240 may be supported by the outer housing 1220. Further, the first camera module 1170 according to the embodiment of the present disclosure is provided with a wing 1030 in a structure of housing surrounding the lens module 1250. Therefore, the first camera module 1170 according to the embodiment of the present disclosure has a slimmer structure while maintaining a stability to absorb impacts.

Figure 4:
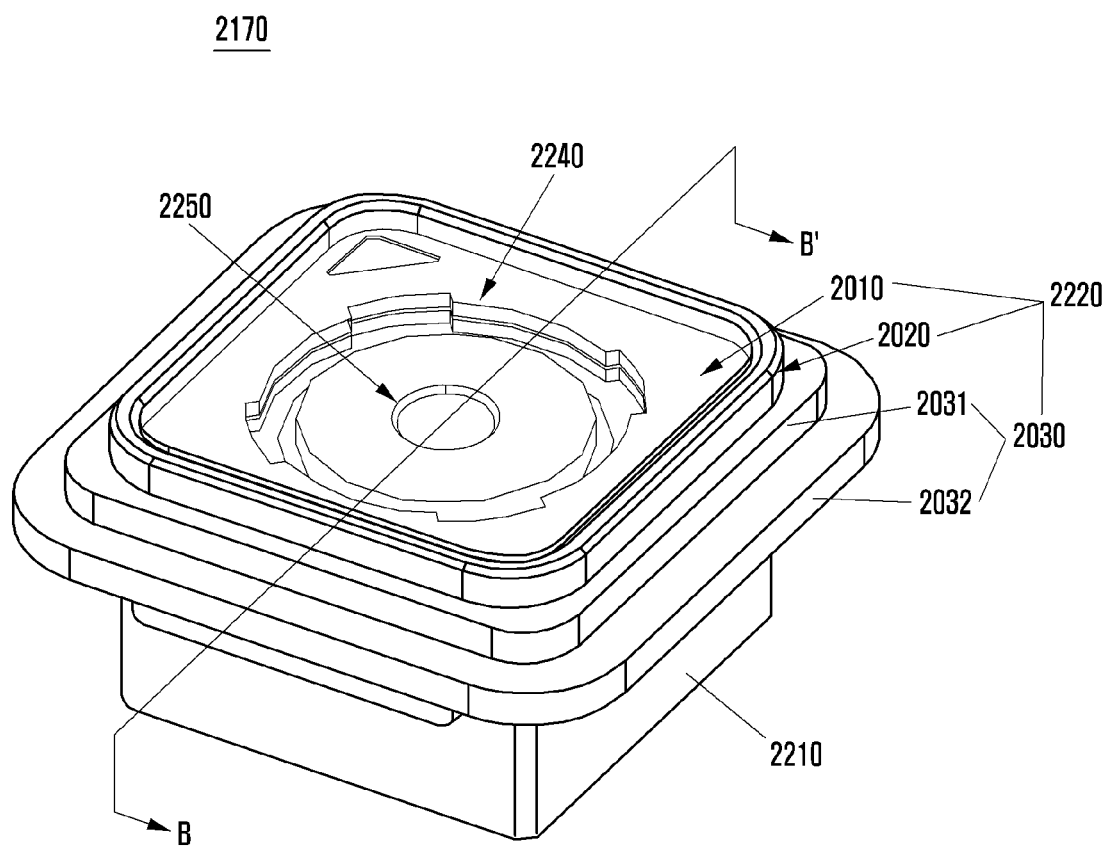
FIG. 4 is a schematic drawing illustrating a second camera module according to another embodiment of the present disclosure.
Figure 5:
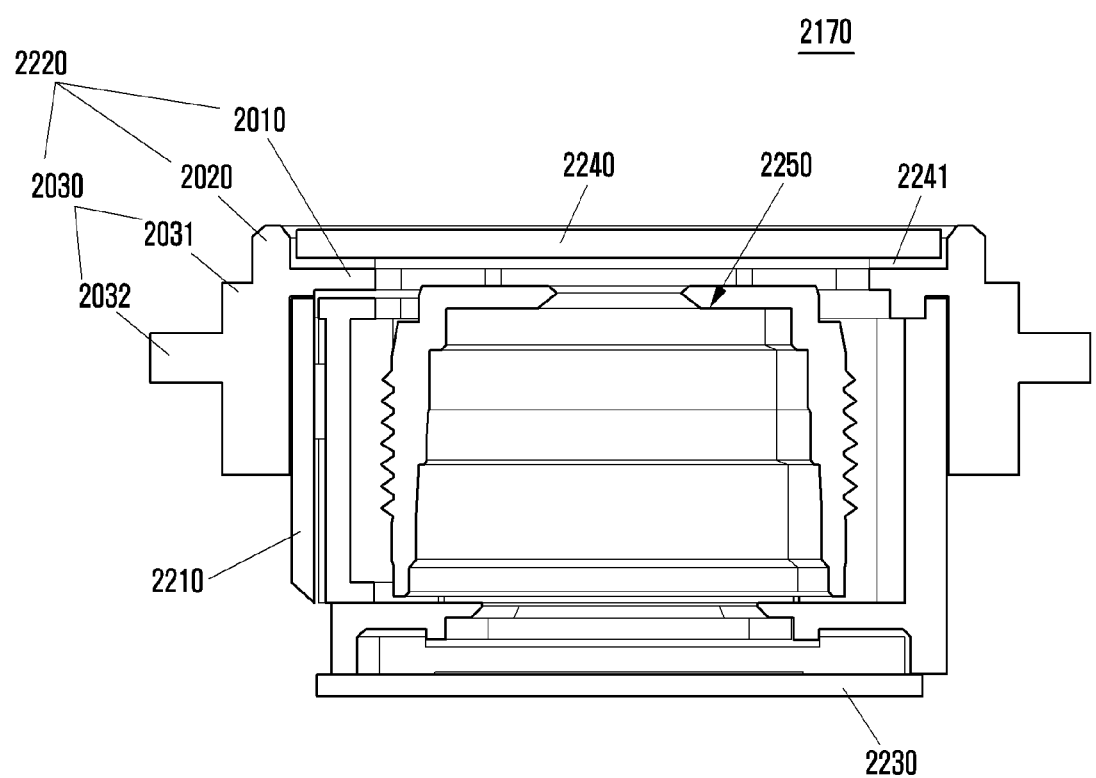
FIG. 5 is a sectional view illustrating a cross section along the line B-B' of FIG. 4.

FIG. 4 is a schematic drawing illustrating an appearance of a second camera module according to a second embodiment of the present disclosure, and FIG. 5 is a view illustrating a cross section along the line B-B' of FIG. 4.

Referring to FIGS. 4 and 5, the second camera module 2170 according to the present disclosure includes a camera PCB 2230, inner housing 2210, outer housing 2220, lens module 2250, and camera window 2240. The second camera module 2170 may further include an adhesive layer 2241 between the camera window 2240 and the outer housing 2220.

In the second camera module 2170 having the above configuration according to the embodiment of the present disclosure, a deco may be joined with the outer housing 2220. Therefore, according to this embodiment, the second camera module 2170 may have a reduced height and the manufacturing process of the terminal can be simplified.

In more detail, the second camera module 2170 according to the second embodiment of the present disclosure may include a camera PCB 2230 at its lower side. The second camera module 2170 may include an inner housing 2210 having an open area at its upper side so that the lens module 2250 can be internally installed. Further, the second camera module 2170 may include an outer housing 2220 which guides the edges of the camera window 2240 and disposes a rear cover and a back cover at its side.

The outer housing 2220 may include a cover unit 2010, sidewall 2020, and wing 2030. The cover unit 2010 is disposed on the top of the sidewalls of the inner housing 2210. The sidewall 2020 is disposed perpendicular to the cover unit 2010 and faces a portion of the sidewalls of the inner housing 2210. The wing 2030 is extended from the sidewall 2020.

With continued reference to FIGS. 4 and 5, the cover unit 2010 may be extended in a predetermined length from the sidewall 2020 in the direction perpendicular to the disposed lens module 2250. The cover unit 2010 is laid on the top of the sidewalls of the inner housing 2210. The cover unit 2010 may be formed wider than the thickness of the sidewall of the inner housing 2210. The cover unit 2010 is provided with a band having a circular penetration hole in the center to expose the lens module 2250. The cover unit 2010 is disposed in the sidewall 2020. The edges of the camera window 2240 are disposed on the top of the cover unit 2010. Here, an adhesive layer may be formed between the edges of the camera window 2240 and the cover unit 2010. The cover unit 2010 may be formed in various shapes such as a circle, quadrangle, and ellipse, however the shape is not limited to these.

The sidewall 2020 includes a lower part and an upper part. The lower part of the sidewall 2020 faces the sidewall of the inner housing 2210 based on the cover unit 2010 formed in the inner housing 2210. The upper part of the sidewall 2020 protrudes upwards from the cover unit 2010. The lower part of the sidewall 2020 performs a role of transferring an impact by contacting a guide block (not shown) provided for a bracket in a process of mounting in the terminal The sidewall 2020 may be provided in a concavo-convex shape for a convenience in arrangement and an expansion of contact area while mounting on the guide block.

The embodiment of FIGS. 4 and 5 illustrates that a protruding sidewall 2020 is provided for each edge, however other embodiments may not be limited to this configuration. Namely, the sidewall 2020 may be formed in a concavo-convex shape having more ribs and grooves. Accordingly, the guide block of the bracket may be also provided in a concavo-convex shape having ribs and grooves corresponding to those of the sidewall 2020.

The inner wall in the upper part of the sidewall 2020 may guide the edges of the camera window 2240. The height of the upper part of the sidewall 2020 is formed same as the thickness of the mounted camera window 2240. Alternatively, the height of the upper part of the sidewall 2020 may be formed to be higher than the camera window 2240 to protect the lens from being scratched.

The wing 2030 may be formed by protruding in the outer direction of the sidewall 2020. The wing 2030 include a first stepped part 2031 and a second stepped part 2032. The first stepped part 2031 is formed having a predetermined height from the sidewall 2020. An edge of the back cover is disposed in a stepped area formed by the first stepped part 2031 and the sidewall 2020. The second stepped part 2032 is formed by protruding with a predetermined width and height from the first stepped part 2031. An edge of the rear cover is disposed in a stepped area formed by the second stepped part 2032 and the first stepped part 2031. A lower stepped area formed by the second stepped part 2032 and the first stepped part 2031 is contacted by the upper end of the bracket.

In the second camera module 2170 having the above configuration according to the present disclosure, the camera window 2240 may be attached to or detached from the outer housing 2220. Accordingly, the height of the second camera module 2170 can be minimized as compared to a conventional arrangement. In particular, the second camera module 2170 minimizes the height between the camera window 2240 and the lens module 2250. Accordingly, the second camera module 2170 can extend a viewing angle of the lens module 2250.

In the meantime, even though the distance between the camera window 2240 and the lens module 2250 in the second camera module 2170 becomes smaller, the sidewall 2020 of the outer housing 2220 can transfer an impact applied from the outside toward the wing 2030. The wing 2030 then transfers the impact to the back cover, rear cover, and bracket connected to the second camera module 2170. As a result, the second camera module 2170 can restrain the lens module 2250 from being damaged by an impact.

Figure 6:
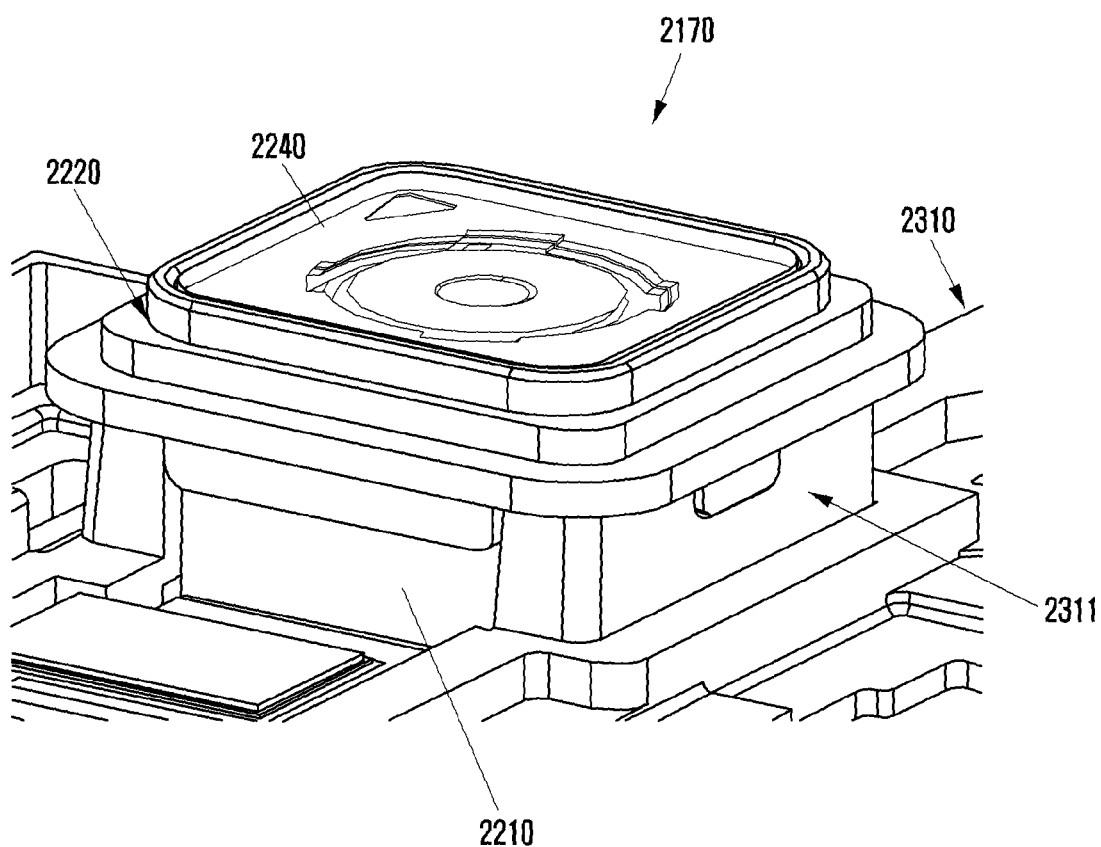
FIG. 6 is a schematic drawing illustrating the second camera module mounted on a bracket according to another embodiment of the present disclosure.

A method for mounting the second camera module 2170 according to the second embodiment of the present disclosure will now be described in more detail referring to FIGS. 6 and 7. FIG. 6 is a drawing illustrating a 3-dimensional structure of the second camera module 2170 of FIG. 4 mounted on a bracket 2310, and FIG. 7 is a sectional view illustrating a portion of the terminal in which the second camera module 2170 of FIG. 4 is mounted.

Figure 7:
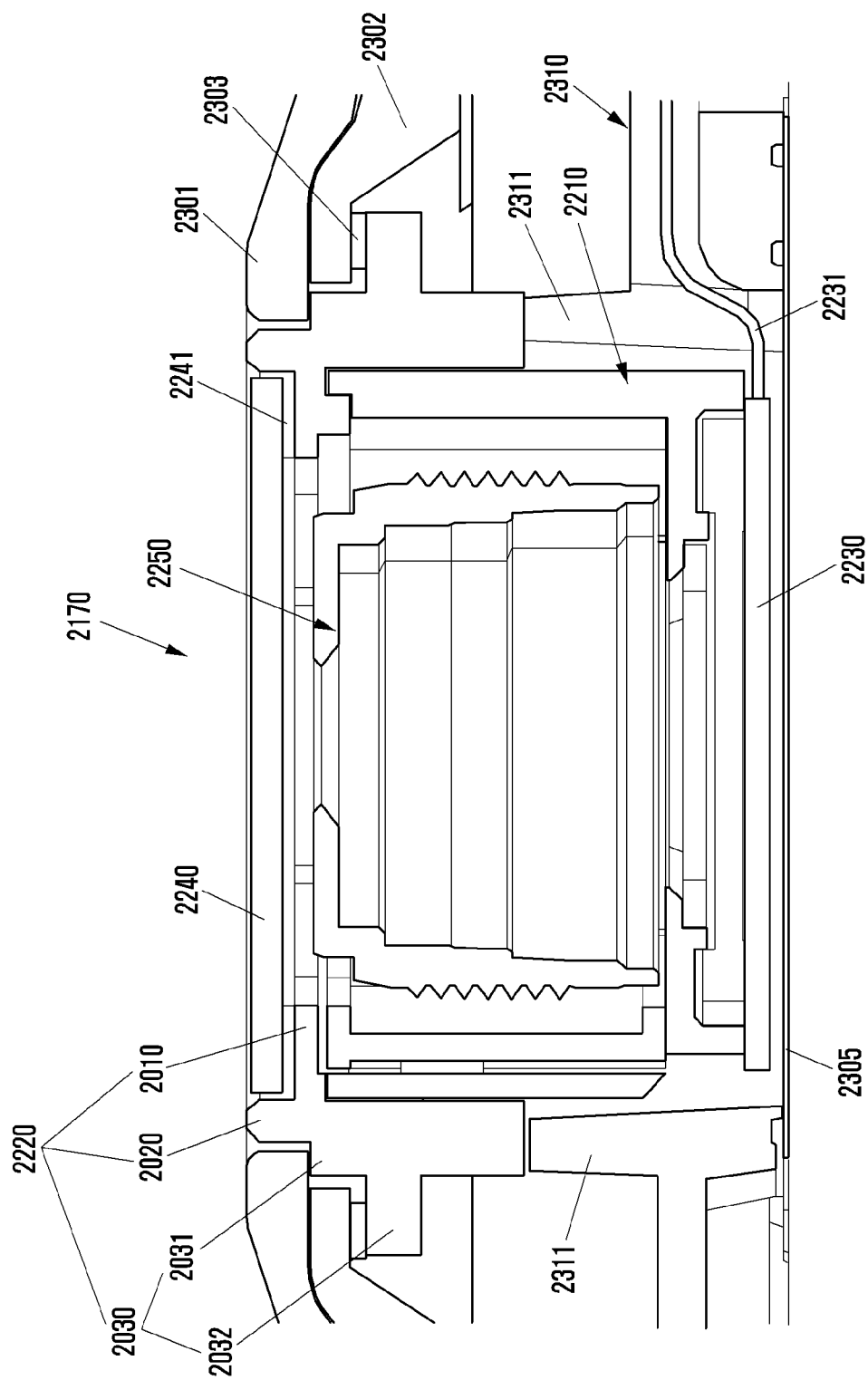
FIG. 7 is a sectional view illustrating a partial cross section at which the second camera module is mounted according to another embodiment of the present disclosure.

Referring now to FIGS. 6 and 7, the terminal according to the present disclosure may include a bracket 2310 for mounting the second camera module 2170. Further, the terminal may include a guide block 2311 so that the second camera module 2170 can be inserted into a predetermined area of the bracket 2310. The guide block 2311 may be provided in a shape corresponding to the shape of the inner housing 2210 of the second camera module 2170. For example, the inner housing 2210 of the second camera module 2170 may be provided in a hexahedron form, but other shapes are permissible.

Corresponding to this, the guide block 2311 may be provided in an intaglio hexahedron form so that the inner housing 2210 in hexahedron form can be settled. In particular, a sidewall of the guide block 2311 is provided with an open area for disposing a FPCB 2231 being connected to the camera PCB 2230 of the second camera module 2170.

Accordingly, if the FPCB 2231 is disposed in the open area of the guide block 2311, the second camera module 2170 can be inserted into the guide block 2311. Further, the guide block 2311 according to the present disclosure is formed so that the shape of block facing the outer housing 2220 corresponds to the shape of the outer housing 2220. Namely, a portion of the sidewall 2020 in the outer housing 2220 may be provided to protrude downwards from the second stepped part 2031 as shown in FIG. 7. Accordingly, the guide block 2311 may be provided with a sidewall in a concavo-convex shape so that the protruding portion of the sidewall 2020 can be settled.

With continued reference to FIGS. 6 and 7, the bracket 2310 provides a rigidity for the terminal and performs a role of blocking radio waves. The bracket 2310 is disposed between unit and a circuit module of the terminal, and provides support so that radio waves generated by the display unit do not introduce noise to the circuit module. Further, the bracket 2310 protects an image displayed in the display unit from being distorted by the radio waves generated from the circuit module. For this, the bracket 2310 may be formed with a special material such as magnesium (Mg). Alternatively, the bracket 2310 may be formed with various radio blocking materials according to a designer's intention.

A module mounting area 2305 of the bracket 2310 for mounting the second camera module 2170 may be formed with a separate material, such as a stainless steel (SUS). The area 2305 with a stainless steel can be formed thinner than that with a magnesium material, and has a characteristic of providing a specific rigidity. Accordingly, the module mounting area 2305 for mounting the second camera module 2170 can be formed thinner than the thickness of the bracket 2310 which is generally applied to the terminal.

Further, the module mounting area 2305 may be formed with a material that is different from the material used in other areas of the module. As described above, the display unit of the terminal is disposed at the bottom of the module mounting area 2305 of the bracket 2310. As a result, the area of the bracket 2310 for mounting the second camera module 2170 is formed relatively thinner than other areas in the terminal according to an embodiment of the present disclosure. Thus, the terminal according to an embodiment of the present disclosure can provide a slimmer design of a terminal by reducing a setting height of the second camera module 2170.

In the meantime, the second camera module 2170 can be provided in a fixed form by supporting the camera window 2240 with the outer housing 2220. Therefore, the assembly of the terminal according to the present disclosure may be performed by mounting the second camera module 2170 in the guide block 2311 of the bracket 2310, and simply connecting the rear cover 2302 and the back cover 2301. Namely, the process of assembling the terminal according to the present disclosure may include operations of forming the guide block 2311 in the bracket 2310, connecting the bracket 2310 and a display module 1400, setting the camera module 2170 in the guide block 2311 of the bracket 2310, coupling the rear cover 2302 to cover the edges of the camera module 2170, and coupling the back cover 2301. Here, the camera module 2170 is assembled so as to be exposed outwards through holes provided in the rear cover 2302 and the back cover 2301.

According to the embodiments of the present invention, the terminal may be manufactured by a method of installing the camera module so that a portion of the camera module is exposed as shown and described in one of the embodiments herein and laying the back cover thereon.

Accordingly, the terminal according to the embodiments of the present disclosure provides a production cost reduction by simplifying an assembly process comparing to the prior assembly process. The second camera module 2170 having the camera window 2240 may further include an adhesive layer 2241 between the cover unit 2010 of the outer housing 2220 and the camera window 2240 to fix the camera window 2240.

In the meantime, the rear cover 2302 is mounted in an upper area formed by the first stepped part 2031 and the second stepped part 2032. Here, a sponge 2303 may be disposed between the second stepped part 2032 and the rear cover 2302. The sponge 2303 is provided in a band form by surrounding the whole second stepped part 2032. The sponge 2303 performs a role of protecting an inflow of contaminants into the outer housing 2220.

As described above, in the terminal having a mounting structure of the second camera module 2170 according to the present disclosure, the sidewall 2020 of the outer housing 2220 is disposed by contacting with the guide block 2311 of the bracket 2310 as shown in the drawings. Accordingly, if an impact is applied from the outside, the impact is firstly transferred to the guide block 2311 of the bracket 2310 through the sidewall 2020 of the outer housing 2220. The transferred impact is then secondly transferred to the rear cover 2302 through the wing 2030 of the outer housing 2220. Here, the terminal according to the present disclosure may be provided with an impact absorbing layer between the sidewall 2020 and the guide block 2311 to reduce the impact transferred through the outer housing 2220. The impact absorbing layer may be configured with various materials having an elastic recovery function for absorbing an impact, such as a gum and a textile. The impact absorbing layer may be disposed and fixed at the bottom surface of the sidewall 2020 or on the top surface of the guide block 2311 of the bracket 2310.

The second camera module 2170 may not be provided with a separate deco structure as described in the mounting structure of the second camera module 2170 according to the second embodiment of the present disclosure, but may be provided so that the outer housing 2220 can replace the role of the deco. Accordingly, the terminal according to the present disclosure can provide a simplified assembly process by omitting the preparation and disposition of the deco.

The outer housing 2220 can be extruded by using a plastic material such as a PC and ABS for plating, and decorated through a post-processing such as a painting, plating, and depositing. The outer housing 2220 can be manufactured by a CNC finishing or die-casting of a metal including aluminum. Further, a surface appearance of the outer housing 2220 can be changed by a diamond cutting or spin hairline finishing. The outer housing 2220 can be variously colored and decorated through a post-finishing such as an anodizing. The above processes can be identically applied to the inner housing 2210. Accordingly, the outer housing 2220 and the inner housing 2210 of the second camera module 2170 according to the present disclosure may further include at least one of a painting layer, plating layer, and deposition layer according to the above finishing processes. Further, at least one of the outer housing 2220 and the inner housing 2210 of the second camera module 2170 according to the present disclosure may include at least one of a diamond-cut layer and a spin hairline finished layer. Further, at least one of the outer housing 2220 and the inner housing 2210 of the second camera module 2170 according to the present disclosure may include a colored layer at least in a portion of the housings. The above layers formed in the first camera module 1170 according to the previously described embodiment of the present disclosure may be applied to a third camera module 3170 which will be described hereafter.

Figure 8:
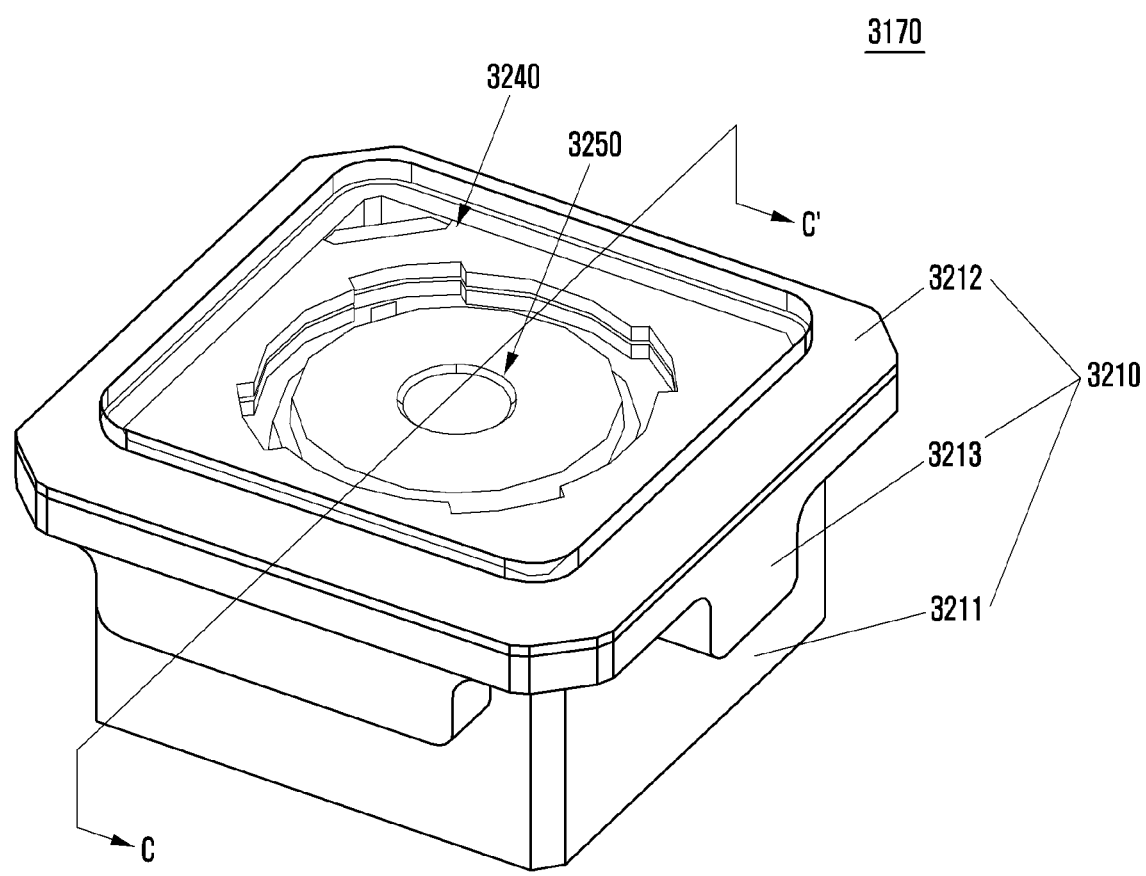
FIG. 8 is a schematic drawing illustrating a third camera module according to another embodiment of the present disclosure.
Figure 9:
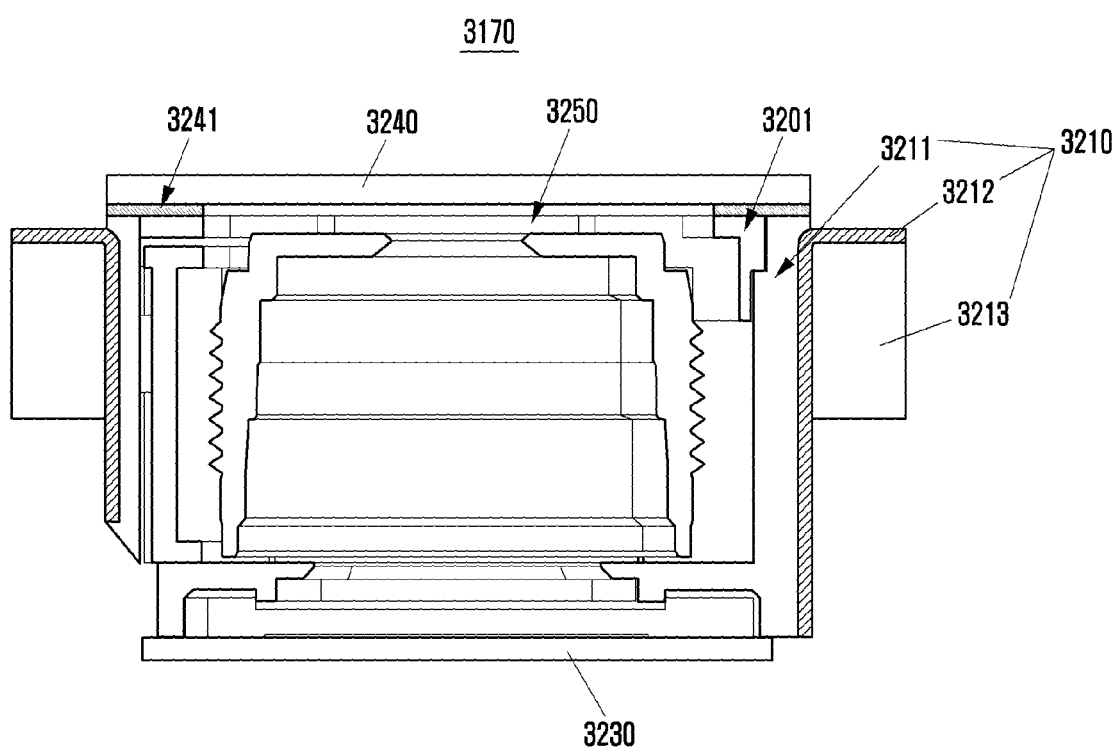
FIG. 9 is a sectional view illustrating a cross section along the line C-C' of FIG. 8.

FIGS. 8 and 9 are drawings illustrating a configuration of a third camera module according to a third embodiment of the present disclosure. In particular, FIG. 8 is a schematic drawing illustrating an appearance of the third camera module according to another embodiment of the present disclosure, and FIG. 9 is a sectional view illustrating a cross section along the line C-C' of FIG. 8.

Referring now to FIGS. 8 and 9, the third camera module 3170 according to the present disclosure may include a camera PCB 3230 and a lens module 3250 having an opening at its upper side. The third camera module 3170 is configured with an integrated housing 3210 disposing a camera window 3240 in the open area. The third camera module 3170 is provided with an adhesive layer 3241 disposed between the camera window 3240 and the upper surface of the integrated housing 3210.

For the third camera module 3170 having the above configuration according to an embodiment of the present disclosure, the integrated housing 3210 may be manufactured by an extrusion method using a plurality of materials. The integrated housing 3210 is formed so that an edge of the housing is connected having a predetermined angle between a column and an upper end with a column, and provided with a rigid structure 3212 formed with a material different from those of sidewall structures 3211 and 3213.

The integrated housing 3210 may be configured with the sidewall structures 3211 and 3213 provided by applying an insert extrusion based on the rigid structure 3212. For this, the rigid structure 3212 may be formed with metals such as a SUS, aluminum, and alloys. The rigid structure 3212 is formed in a predetermined thickness, for example, 0.1~0.4 mm to reinforce the rigidity of the third camera module 3170.

The rigid structure 3212 maintains a strong fixation of the sidewall structures 3211 and 3213 after the insert extrusion. For this, the rigid structure 3212 may include a plurality of penetration holes piercing from the front side to the rear side. The integrated housing 3210 according to the present disclosure is provided so that the sidewall structures 3211 and 3213 located at both sides are connected in the penetration hole area of the rigid structure 3212 by insert-extruding a plastic material based on the rigid structure 3212. In the structure of the integrated housing 3210, an example which the sidewall structures include a column connected to its upper end having a predetermined angle has been described, however the embodiments of the present disclosure are not limited to this. Namely, the side wall structures may be modified to various shapes such as a straight shape and a hook shape.

The inner sidewall structure 3211 may be provided in the rigid structure 3212, and the lens module 3250 can be mounted therein. Accordingly, the inner sidewall structure 3211 provides a space for mounting the lens module 3250. In particular, a mounting unit 3201 is provided in an open upper area of the inner sidewall structure 3211 so that the camera window 3240 can be safely mounted. A hole is formed in the center of the mounting unit 3201 so that the upper end of the lens module 3250 can be exposed to the outside. The mounting unit 3201 supports the edges of the camera window 3240. The edges of the adhesive layer 3241 and the camera window 3240 are arranged at the upper end of the mounting unit 3201. The outer sidewall structure 3213 is provided in the rigid structure 3212 and connected to a column having a predetermined angle.

The upper end of the outer sidewall structure 3213 can support the rigid structure 3212, and the lower end of the outer sidewall structure 3213 may be connected to a bracket. In the third camera module 3170 having the above structure, if an impact is applied from the outside, the impact is transferred through a deco disposed by arranging with the outer sidewall structure 3213 and the rigid structure 3212. The impact is then transferred to the bracket through the lower ends of the rigid structure 3212 and the outer sidewall structure 3213. The outer sidewall structure 3213 may be provided in a concavo-convex shape for an easiness and expansion of contact area when mounting the bracket. The sidewall structure 3213 may be formed with the same material as the inner sidewall structure 3211. For example, the sidewall structures 3211 and 3213 may be provided with a PC (Poly Carbonate), material combined with PC and GF (Glass Fiber), or ABS.

The third camera module 3170 according to the present disclosure may include a rigid structure 3212 disposed between the sidewall structures 3211 and 3213. Therefore, the third camera module 3170 according to the present disclosure reinforces the rigidity of the integrated housing 3210. For that reason, the third camera module 3170 according to the present disclosure can prevent components from being damaged by an impact applied from the outside. A mounting structure of the third camera module 3170 in the terminal according to the third embodiment of the present disclosure will be described in more detail referring to FIGS. 10 and 11.

Figure 10:
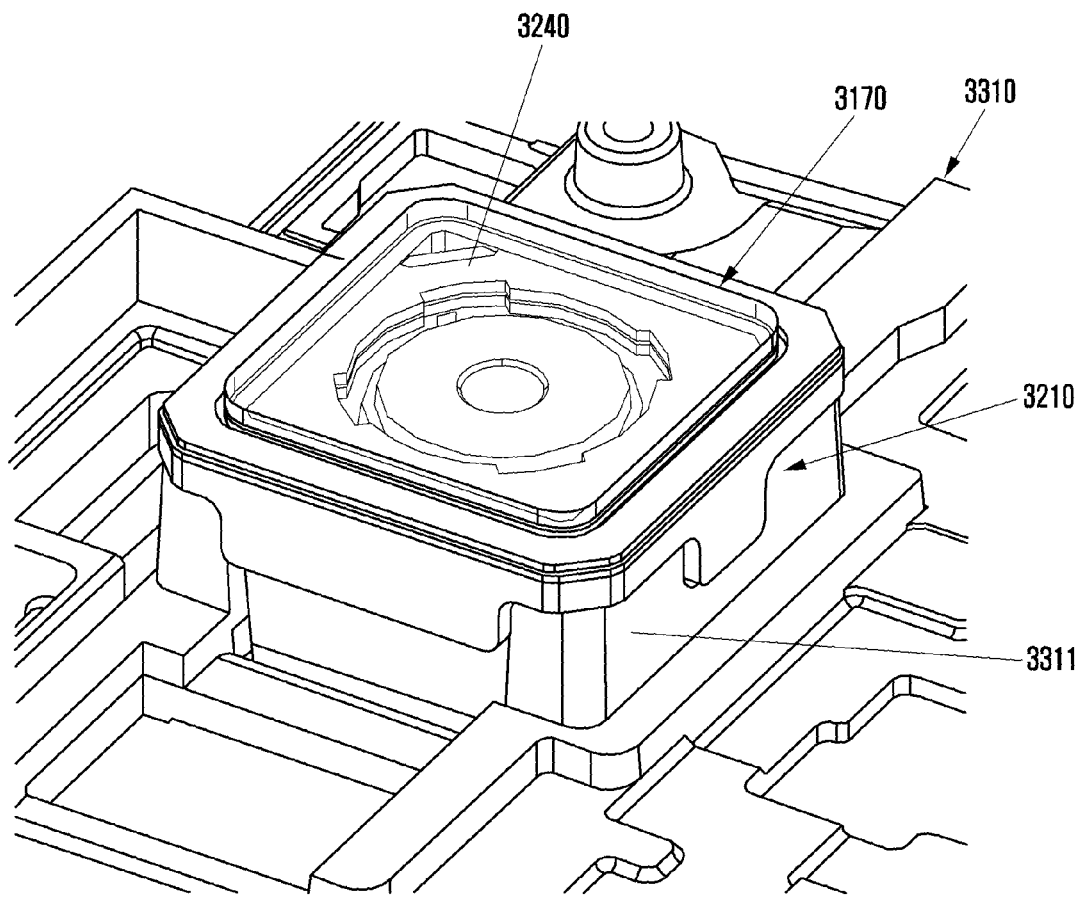
FIG. 10 is a partial schematic drawing illustrating the third camera module mounted on a bracket according to another embodiment of the present disclosure.
Figure 11:
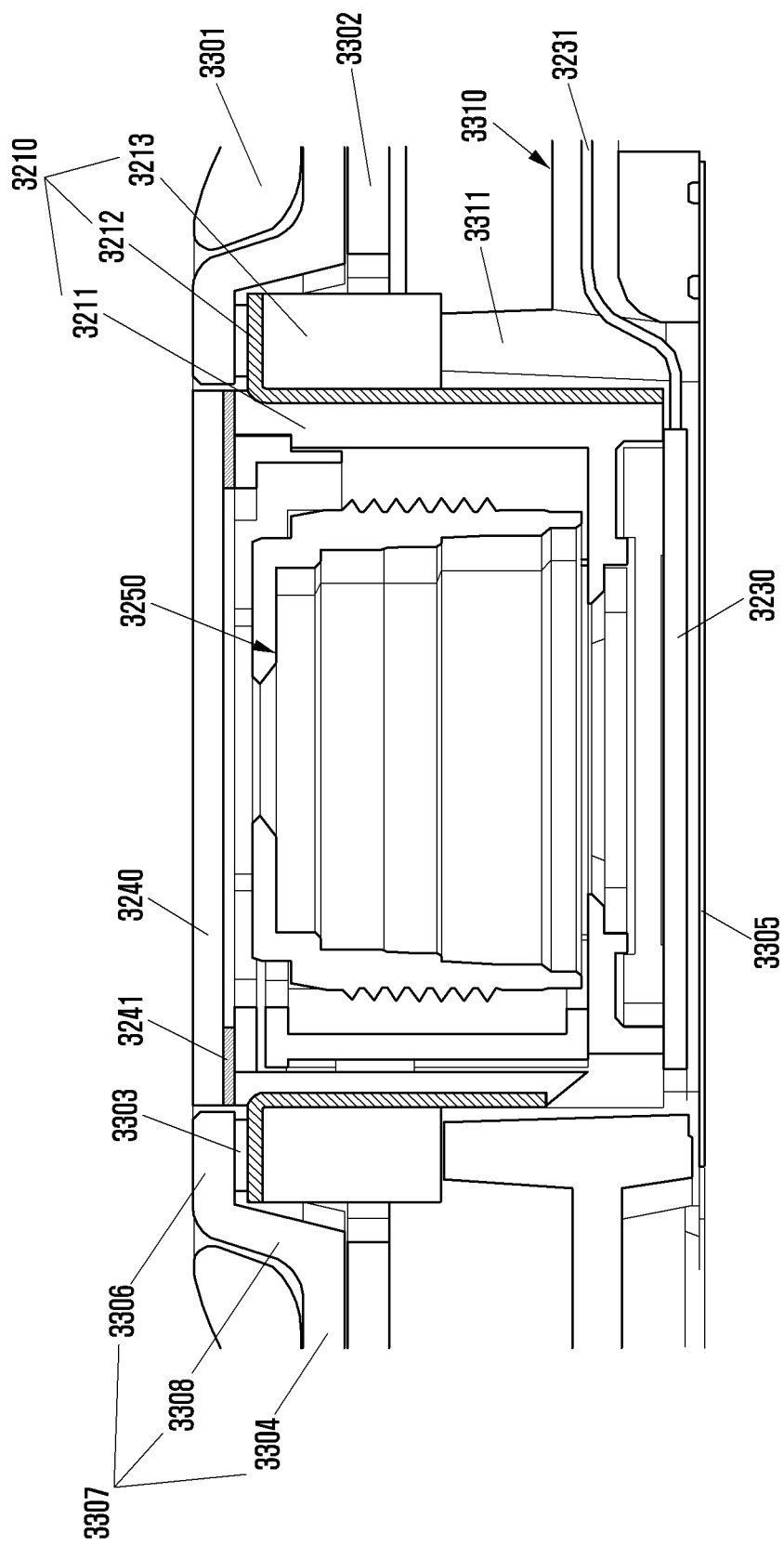
FIG. 11 is a sectional view illustrating a partial cross section of a terminal at which the third camera module is mounted according to another embodiment of the present disclosure.

FIG. 10 is a partial schematic drawing illustrating an appearance of the third camera module 3170 mounted on a bracket 3310 according to another embodiment of the present disclosure. FIG. 11 is sectional view illustrating a partial cross section of the terminal mounted with a rear cover after mounting a third camera module 3170.

Referring now to FIGS. 10 and 11, the third camera module 3170 according to the third embodiment of the present disclosure may be mounted in a guide block 3301 of the bracket 3310. The guide block 3301 is formed corresponding to the outer sidewall structure 3213 of the integrated housing 3210. Namely, the guide block 3301 is formed in a concavo-convex shape corresponding to the outer sidewall structure 3213 formed in a concavo-convex shape. A side of the guide block is provided in an open shape so that a FPCB connected to a PCB of the third camera module 3170 can be disposed. A module mounting area of the bracket 3310 for mounting the third camera module 3170 is formed thinner than adjacent areas. For this, the module mounting area 3305 may be provided with a material different from those of adjacent areas of the bracket 3310.

The rigid structure 3212 of the integrated housing 3210 is aligned to the outer side wall structure 3213. A sponge 3303 is disposed in an upper area of the integrated housing 3210 exposed outer wards. Here, the sponge 3303 performs a role of preventing contaminants from flowing into the third camera module 3170 or the rear cover 3302. A side of a deco 3307 is disposed on the top of the sponge 3303. The outer side wall structure 3213, a portion of the rigid structure 3212, the sponge 3303, and an edge of the deco 3307 are accordingly arranged and disposed. The arrangement heights of the sponge 3303 and the deco 3307 are formed similar to that of the camera window 3240.

The deco 3307 include a band part 3306, first extension 3308, and second extension 3304 as shown in the drawing. The band part 3306 is disposed on the top of the sponge so as not to be overlapped by the camera window 3240. The first extension 3308 is connected to the band part 3306, and extended in the direction to the outer side wall structure 3213. The second extension 3304 is extended in a predetermined length in the direction parallel to the rear cover 3302. Here, the first extension 3308 is provided to have a predetermined slope angle from an edge of the band part 3306. Accordingly, an impact transferred to the band part 3306 is transferred to the second extension 3304 through the first extension 3308 having a predetermined slope angle. The impact can be partially reduced by the first extension 3308 having the predetermined slope angle in a process of transferring the impact.

The rear cover 3302 is disposed to support the second extension 3304 of the deco 3307. For example, the rear cover 3302 can be disposed to expose the third camera module 3170 after mounting the third camera module 3170 into the bracket 3310. For this, the rear cover 3302 is provided in an open shape corresponding to the area of the third camera module 3170. The height of the upper part of the rear cover 3302 can perform a role of absorbing and relaxing an impact transferred from the second extension 3304.

The back cover 3301 may be provided to have a partially open area so that the third camera module 3170 can be exposed outer wards. In particular, the open area of the back cover 3301 may be provided so that the camera window 3240 and the deco 3307 can be exposed. The back cover 3301 is contacted by the front sides of the first extension 3308 and the second extension 3304. Accordingly, an impact transferred through the band part 3306 can be transferred to the front side of the back cover 3301.

As described above, the third camera module 3170 according to the third embodiment of the present disclosure is configured by an insert extrusion of the integrated housing 3210. The third camera module 3170 is provided so that the sidewall structures 3211 and 3213 are disposed at the inner and outer sides of the rigid structure 3212. In the third camera module 3170 having such a structure, an impact is absorbed by the integrated housing 3210, and the third camera module 3170 transfers the impact to the bracket 3310 and other structures. Through this process, damages of components can be minimized by providing the integrated housing 3210 based on the rigid structure 3212.

Further, the electronic device 100 having a camera module according to various embodiments of the present disclosure may include mobile communication terminals operating by communication protocols corresponding to various communication systems, and include, for example, hardware such as transmitters, receivers, transceivers, antennas microprocessor/controller comprising circuitry configured for operation, etc., and data communication equipment and multimedia equipment such as a PMP (Portable Multimedia Player), digital broadcast player, PDA (Personal Digital Assistant), music player (for example, MP3 player), portable game terminal, smart phone, notebook, and hand-held PC.

As described above, the terminal having a camera module according to the present disclosure enables to reduce a mounting space of the camera module by providing a slimmer camera module.

Further, a configuration of the terminal according to an embodiment of the present disclosure enables to improve an impact resistance while maintaining the miniaturization of a camera module.

Further, the configuration of the terminal according to an embodiment of the present disclosure enables to improve the productivity of terminal by simplifying a manufacturing process of terminal through integration of components.

In addition, an artisan understands and appreciates that under the broadest reasonable interpretation in the disclosure and appended claims, that a "processor", "microprocessor" or "controller" or "control unit" comprises hardware including circuitry that is configured to operate by the execution of machine executable code. Under the broadest reasonable interpretation, the appended claims constitute statutory subject matter in compliance with 35 U.S.C. §101.

The definition of the terms "unit" or "module" as referred to herein is to be understood as constituting hardware including circuitry such as a processor or microprocessor that may comprise an integrated circuit configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

Although exemplary embodiments of the present disclosure have been described in detail hereinabove, it should be clearly understood that many variations and modifications of the basic inventive concepts herein taught which may appear to those skilled in the present art will still fall within the spirit and scope of the present invention, as defined in the appended claims.

The above-described embodiments of the present disclosure can be implemented in hardware, firmware or via the execution of software or computer code loaded into hardware that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium and loaded into hardware having circuitry that is used in general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software in conjunction with hardware or a combination of both and may be performed in whole or in part within the programmed instructions of a computer. No claim element herein is to be construed under the provisions of 35 U.S.C. 112, sixth paragraph, unless the element is expressly recited using the phrase "means for".

Although embodiments of the disclosure have been described in detail hereinabove, an artisan should be understand that many variations and modifications described herein will fall within the scope of the appended claims.

What is claimed is:

1. An electronic device including a camera module, the camera module comprising:
    a camera lens module including at least one lens and a shutter slit;
    a housing including an inner portion disposed to surround a camera Printed Circuit Board (PCB) for a camera circuit module and an outer portion of the housing that is joined with the inner portion, the outer portion of the housing covers the camera lens module and which includes an opening that exposes at least a portion of the camera lens module;
    an image sensor arranged within the housing that collects light passing through the at least one lens, in which the circuit module transmits collected light image information from the image sensor for processing;
    a camera window that covers the opening of the housing and is supported by the housing so that an impact generated at a front side of the camera window is delivered to the housing and absorbed by at least a rear cover and the housing;
    a deco disposed on the housing and that covers the opening;
    and an adhesive layer disposed between the housing and the deco.

2. The electronic device of claim 1, wherein the camera module further comprises an adhesive layer disposed between the camera window and the housing.

3. The electronic device of claim 1, further comprising:
    the rear cover is supported by a portion of the deco and includes an opening that exposes the camera window.

4. The electronic device of claim 3, further comprising:
    a back cover supported by another portion of the deco and/or the rear cover, and in which the back cover includes an opening of the camera window.

5. An electronic device, comprising:
a display module;
a back cover;
a rear cover disposed between the display module and the back cover;
and a camera module disposed partially in a space formed between the rear cover and the display module;
wherein the camera module includes:
a camera lens module having at least one lens and a shutter slit,
a housing that surrounds a camera Printed Circuit Board (PCB) for a camera circuit module, and the housing has an opening that exposes at least a portion of the camera lens module and to contain the camera lens module,
an image sensor arranged within the housing that collects light passing through the at least one lens, in which the circuit module transmits collected light image information from the image sensor for processing;
and a camera window covering the opening of the housing and is supported by the housing;
wherein the rear cover has an opening for exposing the camera window and to be supported by a portion of the housing, and the back cover is configured to include an opening for exposing the camera window and is supported by a portion of the rear cover and a portion of the housing so that an impact generated at a front side of the camera window is delivered to the housing and absorbed by at least the rear cover and the housing.

* * * * *